United States Patent [19]
Kareman

[11] 3,925,867
[45] Dec. 16, 1975

[54] COMBINATION SAW AND FILING BLADE FOR USE WITH JIG OR SABRE SAW

[76] Inventor: James Kareman, 516 Monmouth Ave., Bradley Beach, N.J. 07720

[22] Filed: Feb. 4, 1975

[21] Appl. No.: 547,011

[52] U.S. Cl. ............... 29/78; 29/76 A; 29/95 B; 83/837
[51] Int. Cl.² ....................... B23D 71/00
[58] Field of Search ....... 29/78, 76 A, 95 B; 83/746, 83/749, 837, 697

[56] References Cited
UNITED STATES PATENTS
| | | | |
|---|---|---|---|
| 1,240,173 | 9/1917 | Brewer | 83/837 |
| 1,676,071 | 7/1928 | Bolinder | 29/95 B |
| 3,314,456 | 4/1967 | Craven | 83/837 |

Primary Examiner—Leonidas Vlachos

[57] ABSTRACT

A novel blade for accomplishing a simultaneous sawing and filing operation, the blade being readily attachable in a chuck of a portable, electrically powered jig or sabre saw so that a rapid reciprocal movement of the blade cuts and files a work at a same time; the blade comprising a flat metal bar having a row of cutting teeth on each opposite flat side, each tooth having cutting edges on three sides; either one of the opposite side cutting edges serving to saw (depending upon the direction of the tool travel) and a third cutting edge between the opposite sides serving as a file so to file the face of the cut being made.

3 Claims, 6 Drawing Figures

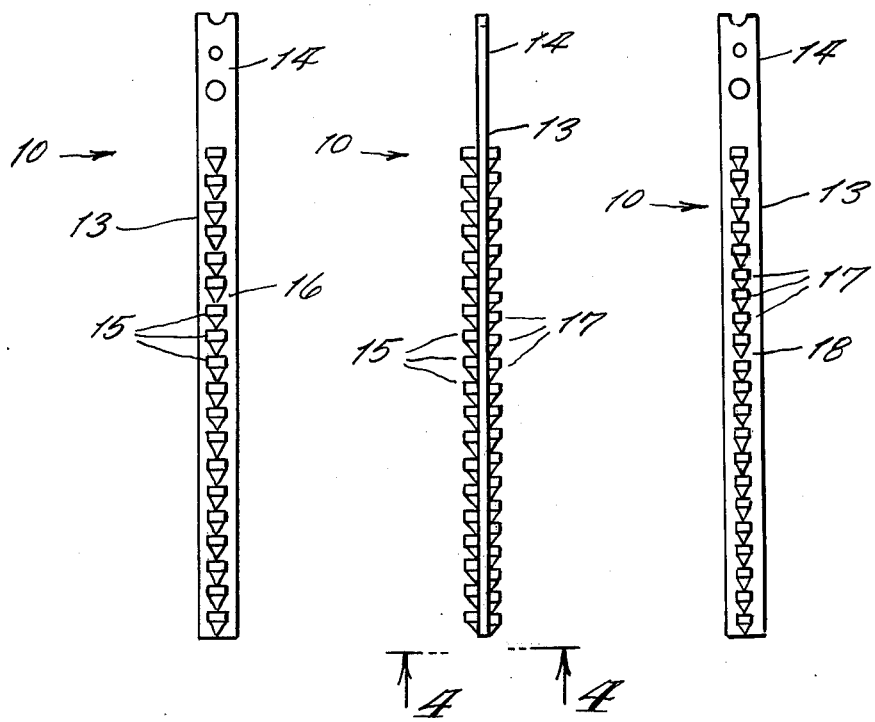
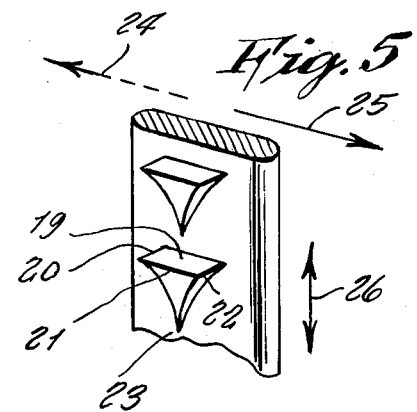
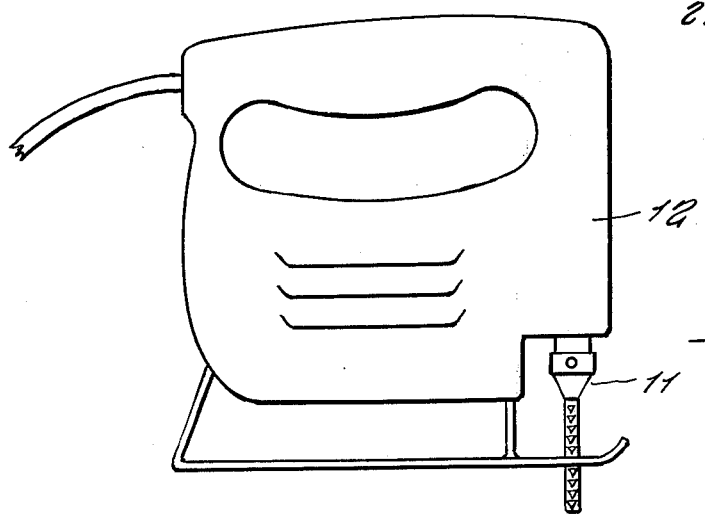

COMBINATION SAW AND FILING BLADE FOR USE WITH JIG OR SABRE SAW

BACKGROUND OF THE INVENTION

This invention relates generally to cutting blades.

Heretofore there has not been known any economical means for power filing a work in a reciprocal back and forth movement of the blade. Such accessories that have been designed for the intended task and which are attachable to a portable power drill have a rotary movement rather than a reciprocal movement so that their working is slow, and due to lacking a means for suport are accordingly difficult to guide and control so that they tend to leave a wavy finish as a result. This situation is of course objectionable and is therefore in want of an improvement.

SUMMARY OF THE INVENTION

Thus it is a principal object of the present invention to provide a blade that uses a jig or sabre saw as a power source for guiding and controlling a reciprocally moving, cutting blade in a more accurate, easy and fast manner, the blade performing both a sawing of a work and filing a side face of the sawn groove.

Another object is to provide a cutting blade in which the teeth on one side of the blade are coarser for use on stock lumber or the like, and which on an opposite side has finer teeth so to be suitable for use on plywood, plastic or metal.

Still another object is to provide a cutting blade which is reversible so to be adaptable for right or left handed users.

Other objects are to provide a combination saw and filing blade which is simple in design, inexpensive to manufacture, rugged in construction, easy to use, and efficient in operation.

BRIEF DESCRIPTION OF THE DRAWING

These and other objects will be readily evident upon a study of the following specification and the accompanying drawing, wherein:

FIG. 1 is a left side view of the blade.

FIG. 2 is a front edge view thereof.

FIG. 4 is a bottom view in direction 4—4 of FIG. 2.

FIG. 5 is a fragmentary perspective view showing a typical tooth.

FIG. 6 is a view of the blade secured in a jig saw tool.

PREFERRED EMBODIMENT OF INVENTION

Referring now to the drawing in detail, the reference numeral 10 represents a combination saw and filing blade according to the present invention wherein the same can be mounted in a chuck 11 of a portable, electrically powered jig or sabre saw 12.

The blade 10 includes a flat steel bar 13 that is approximately three thirty-second inch thick and about one-fourth inch wide so to resist against bending.

One end 14 of the bar is suitable for being fitted into the chuck. The other end of the bar has a singular row of teeth 15 formed on one flat side 16 and another singular row of teeth 17 on an opposite flat side 18. As shown, teeth 15 are more coarse, while teeth 17 are more fine, so to each be suitable for cutting different type of material.

Each tooth has a rectangular flat face 19 which extends at right angle to the bar flat sides, the face 19 having three cutting edges 20, 21, and 22. From the flat face, each tooth body tapers to a point 23. The opposite cutting edges 20 and 22 are for sawing depending upon the travel direction of the tool. The edge 21 therebetween files the face of the cut being made by the blade.

Thus an improved combination saw and filing blade is provided for use with a jig or sabre saw. In operation, the blade travels in directions 24 or 25, while reciprocally moving up and down as indicated by arrow 26.

I claim:

1. In a combination Saw and Filing Blade for use with a Jig or Sabre Saw, the combination of a bar made of suitable hard steel; said bar having flat opposite sides; one end of said bar being adaptable for being held in a chuck of a portable electrically powered Jig or Sabre Saw, and a longitudinal row of teeth formed on each of said flat sides, having means for sawing and filing at the same time; each said tooth including a flat rectangular face having three cutting edges, and a body of said tooth tapering from said face to a point.

2. The combination as set forth in claim 1, wherein opposite two of said cutting edges comprises sawing edges and a cutting edge therebetween comprises a filing edge.

3. The combination as set forth in claim 2, wherein teeth on one side of said bar are coarse and teeth on an opposite side are fine.

* * * * *